Dec. 25, 1962 R. D. LEAKEY 3,069,803
FISH-TRAPS
Filed Dec. 16, 1958 4 Sheets-Sheet 1
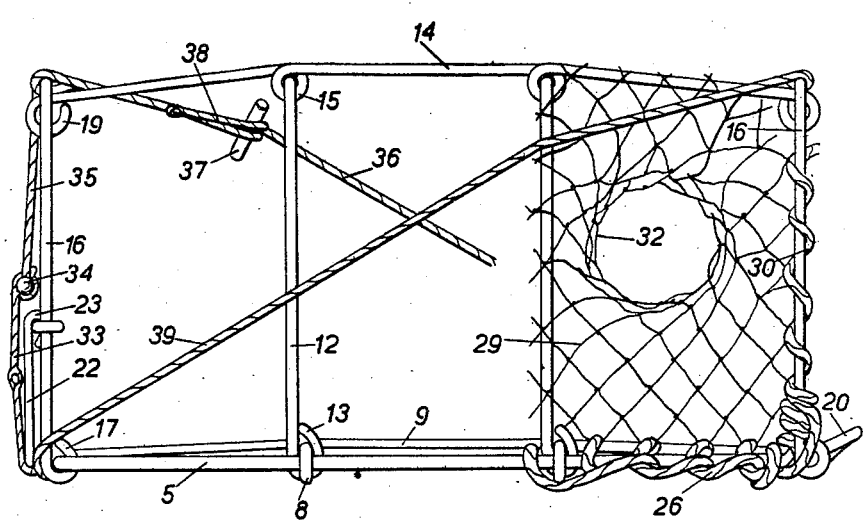
— FIG. 1. —
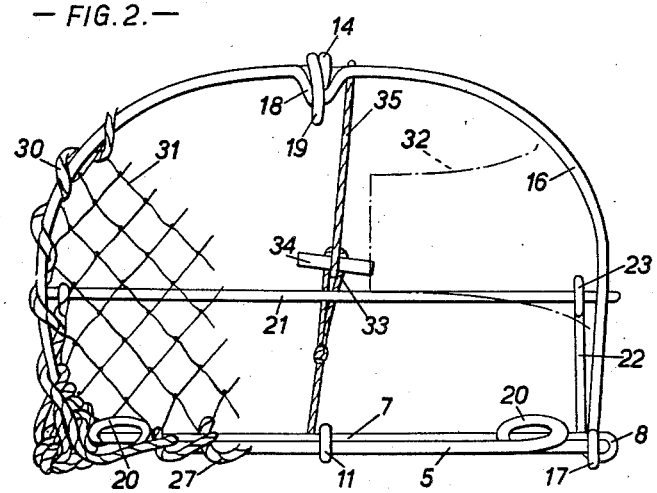
— FIG. 2. —
INVENTOR
Robert Dove Leakey
BY
ATTORNEY Dec. 25, 1962    R. D. LEAKEY    3,069,803
FISH-TRAPS
Filed Dec. 16, 1958    4 Sheets-Sheet 2
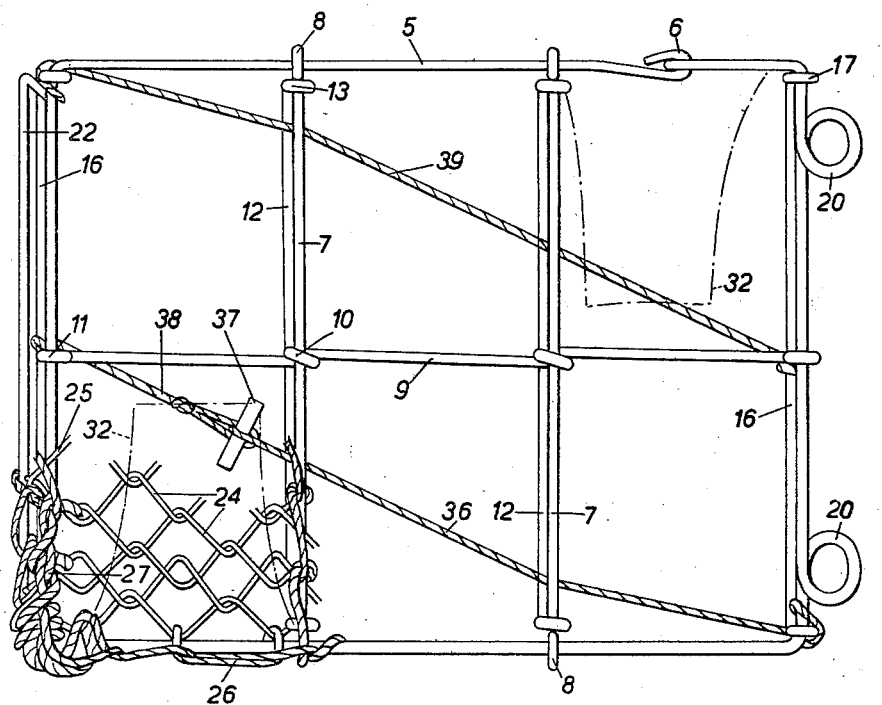
— FIG. 3.—
— FIG. 4.—
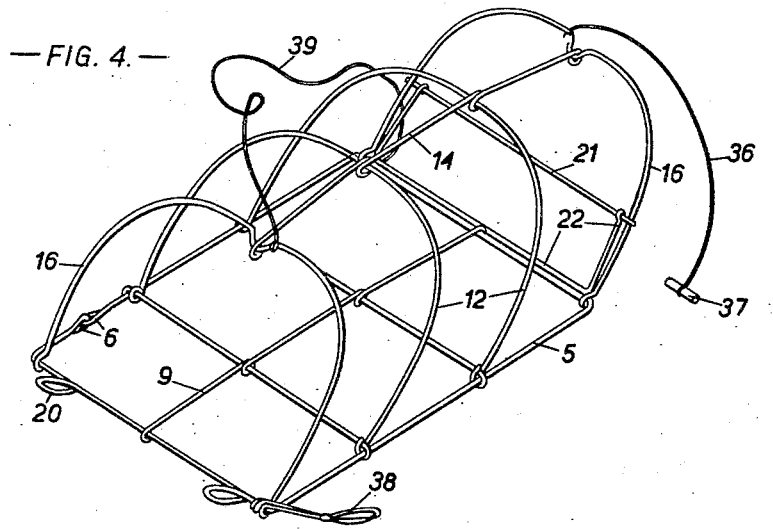
INVENTOR
Robert Dove Leakey.
BY
ATTORNEY

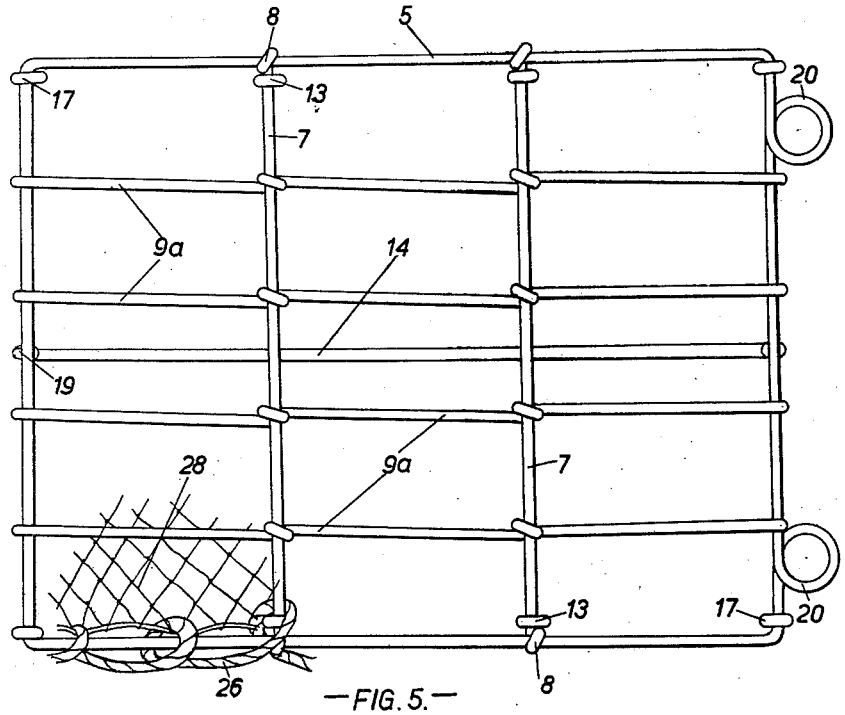
—FIG. 5.—
—FIG. 6.—
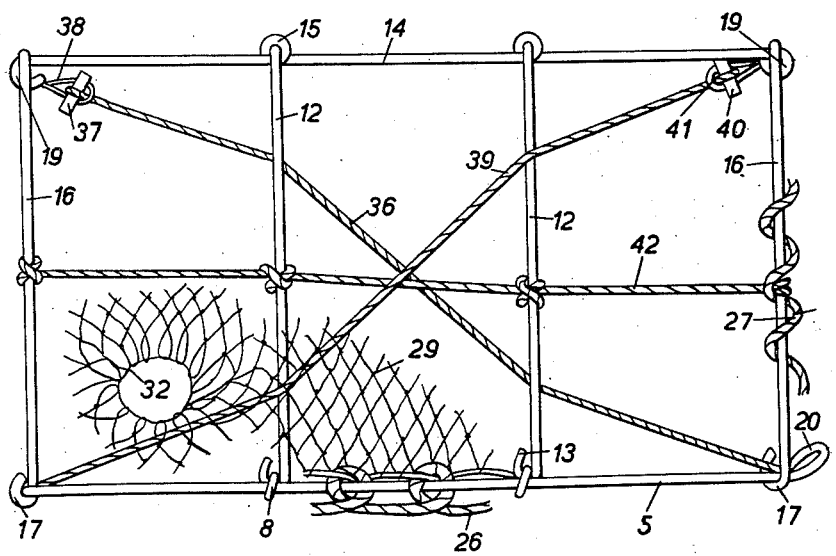

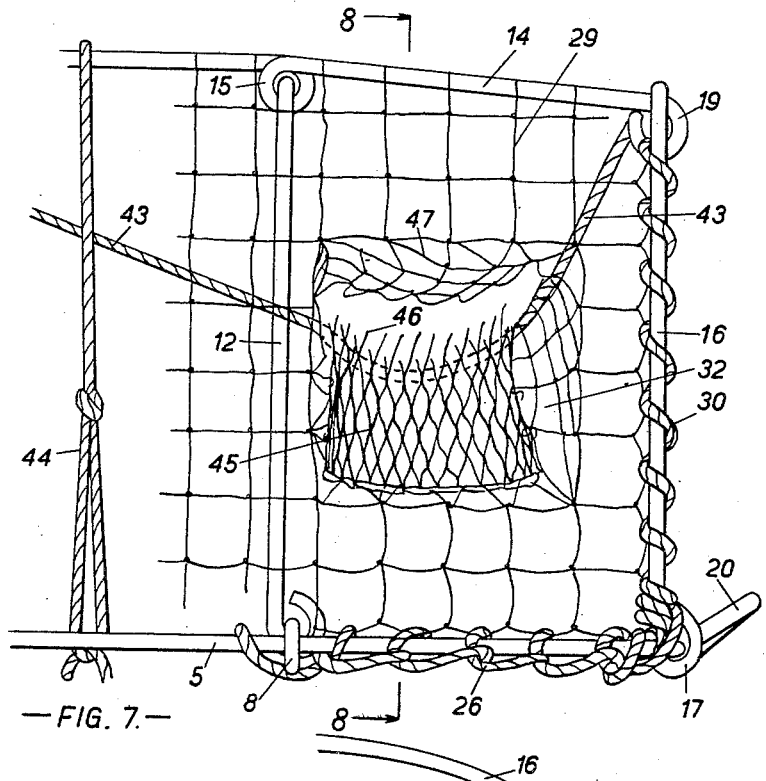
—FIG. 7.—
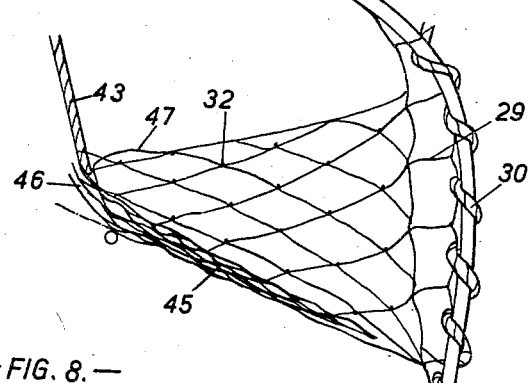
—FIG. 8.—
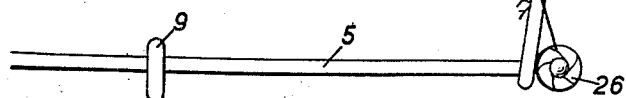
INVENTOR
Robert Dove Leakey
BY
ATTORNEY _United States Patent Office_

3,069,803
Patented Dec. 25, 1962

3,069,803
FISH-TRAPS
Robert Dove Leakey, Sutcliffe House, Giggleswick,
Settle, England
Filed Dec. 16, 1958, Ser. No. 780,714
Claims priority, application Great Britain Jan. 18, 1958
8 Claims. (Cl. 43—105)

This invention relates to fish-traps, and has particular, but not exclusive, reference to traps for decapod crustaceans (e.g. lobsters, crayfish, prawns, and crabs), such traps in their various traditional forms, being almost invariably of nailed wooden construction, and hence liable to break up after a relatively short life especially if pounded by the sea, thrown against rocks, or subjected to rough usage by fishermen.

Other well recognized drawbacks of the traditional fish-traps are the amount of space which they occupy, either on board or ashore, when not in use, and the effort involved in handling them when loaded with the heavy sinkers necessary to overcome their inherent buoyancy but very liable to damage the adjacent woodwork in conditions of heavy surge.

One object of the present invention is to provide an improved construction of fish-trap which is effectively storm- and gale-proof, so that it can be worked close inshore without the fisherman having to risk his life and boat in moving his gear to deeper water should bad weather threaten.

A second object of the invention is to provide a fish-trap which can be stored in a very much smaller space than a traditional trap of similar fishing capacity, is much lighter to handle at all times, and can readily be freed from seaweed tangles such as frequently hamper the hauling of such traps.

A third object of the invention is to provide a trap which, although readily entered by crustaceans and other fish, is substantially escape-proof.

According to this invention, the improved fish-trap comprises an openwork base defined by a metal frame of closed rectangular profile, a plurality of metal arches having their extremities pivoted to said base upon axes transverse to the latter, a link connecting the crests of said arches so as to constrain the same to simultaneous angular movement, a netting canopy extending over said arches and marginally connected to said base, and releasable means for securing said arches and canopy in erected condition.

In a preferred arrangement, two arches are pivoted upon oppoiste ends of the base frame and at least one further arch is pivoted upon a cross-bar spanning such frame, all the members aforesaid being formed of stout wire and connected together by bending them one around another.

The interior of the base frame may be filled by interlinked wire members anchored to such frame and coated with a protective composition.

The base frame and end arches may be protected by a rope binding which also secures the netting canopy thereto, the word "rope" as used above and hereafter being understood to include a flat-section material such as tape.

The aforesaid releasable means for securing the arches and canopy in erected condition conveniently comprises two cords attached respectively to one corner of the base and to the crest of the opposite end arch, one such cord being attached to the central portion of a peg-button adapted to be engaged with a loop in the other cord to form a diagonal brace.

A further bracing cord may be permanently connected diagonally of the trap in opposition to the releasable securing means aforesaid to constrain the arches to collapsing movement in a single direction.

The canopy aforesaid is formed with at least one entrance spout comprising a tube of cord netting whose inner end, at least, is constrained to a laterally-elongated cross-section by means of a flexible supporting member applied to the lower and side parts of its periphery only, the top portion of such spout being left limp and the floor portion thereof incorporating or consisting of a relatively close-mesh grating of thermoplastic synthetic resin whose inner end projects beyond and/or across that of the spout and whose relative stiffness is such as to maintain the adjacent portion of the spout substantially at its maximum width whilst being insufficient to prevent flexure of the projecting end aforesaid under pressure from a fish entering, or attempting to leave the trap.

This grating may be so treated that the constitutent bars of its inner terminal portion form freely-projecting bristles which may have a different degree of stiffness from that of the rest of the grating.

Referring to the drawings;

FIG. 1 is a side elevation of a preferred form of lobster trap according to the present invention, FIG. 2 is an end elevation taken from the right-hand side of FIG. 1, FIG. 3 is an underside plan view of the trap, FIG. 4 shows the improved trap in partially collapsed condition, FIGS. 5 and 6 are views corresponding respectively to FIGS. 3 and 1, but showing in each case a modified construction, FIG. 7 is a fragmentary side elevation of the trap showing a preferred construction of entrance spout, and FIG. 8 is a section on the line 8—8 of FIG. 7.

In the example illustrated, the invention is applied to a lobster trap measuring approximately 24 inches long, 18 inches wide and 12 inches high.

The base of such trap includes a main frame member 5 produced by bending a stout steel wire into a rectangular shape and interengaging eyes 6 formed at opposite extremities of such wire. Two cross-bars 7 of similar, but somewhat thinner, wire have their extremities permanently hooked at 8 around the side portions of the member 5, a longitudinal wire 9 being curled around the central portions of the cross-bars at 10 to maintain the spacing of the latter and the extremities of this wire are permanently hooked at 11 to the end portions of the member 5.

Each cross-bar 7 has hingedly mounted thereon a wire arch 12 whose hooked extremities 13 embrace such bar immediately adjacent its own hooks 8. A longitudinally-disposed top wire 14 is curled at 15 around the crest portions of the arches 12 to maintain the latter at the same distance apart as the bars 7.

Two similar wire arches 16 are hingedly mounted upon the end portions of the rectangular member 5 by permanently hooking their extremities 17 adjacent the corners of such member, and downward kinks 18 at the crests of these end arches 16 are permanently engaged with the hooked extremities 19 of the top wire 14 which is thereby located directly above the wire 9.

Spaced loops 20 are formed in one end portion of the main frame member 5 to serve as hauling eyes for the trap, whose opposite end arch 16 has a fixed wire cross-bar 21 upon which a U-shaped wire member 22 is hingedly mounted, by means of its hooked ends 23, so as normally to hang adjacent the limbs of the arch 16 and the adjacent end portion of the member 5.

The various wire members above referred to are protected from corrosion by galvanization followed by coating with a bituminuous or other composition, the various eye or loop formations being made large enough to allow protection of the full periphery of the wire at all points.

The interior of the main frame member 5 is filled in by means of plastic-covered zig-zag wires 24 disposed longitudinally of such member in staggered relation and interlinked each with the next, as fragmentarily shown in FIG. 3, the ends of adjacent wires 24 being hooked together as at 25 to provide a netting panel whose edges are anchored to the frame member 5 by means of rope bound around the periphery of the latter at 26, 27.

In the alternative construction shown in FIG. 5, the interlinked zig-zag members 24 and medial wire 9 are replaced by a plurality of longitudinally disposed bottom wires 9a which are secured to the member 5 and the cross-bars 7 as previously described and which may serve to support a floor panel 28 of cord netting held in place by the rope bindings aforesaid.

The rope binding at 26 also serves to anchor to the side portions of the frame member 5 the ends of a rectangular panel 29 of cord netting which is thereby stretched over the arches 12, its lateral edges being anchored around the end arches 16 by means of further rope bindings at 30.

The ends of the trap are covered by D-shaped panels 31 of cord netting held in place by the rope bindings 30, as well as by one of the end bindings 27 of the member 5 and by a further binding around the U shaped member 22 (not shown).

The netting canopy represented by the panels 29, 31 aforesaid may be formed (for example, at one or each side thereof) with any desired arrangement of entrance spout 32, it being preferred, however, to employ the improved spout construction hereinafter described.

The U-shaped member 22 and associated netting panel 31 collectively form a door through which the trap can be baited and which is normally held closed by releasable fastening means acting upon its free edge. Conveniently such means comprise a cord loop 33 attached to the adjacent end portion of the frame member 5 and a co-acting peg-button 34 connected by a second cord 35 to the crest of the adjacent end arch 16.

Normally the arches 12, 16 are held erect, and the netting panel 29 substantially taut, by means of a similar releasable fastening arranged to form a diagonal brace for the trap. For example, a cord 36 carrying a peg-button 37 and attached to one corner of the frame member 5 adjacent the door may co-operate with a cord loop 38 connected to the crest of the opposite end member, or vice versa, the pull of this fastening means being resisted by a bracing cord 39 connected between the crest of the arch 16 which carries the door and the corner of the frame member 5 diagonally opposite to the attachment point of the cord 36.

As shown in FIG. 6, this cord 39 may terminate in a peg-button 40 engageable with a fixed loop 41 and whichever arrangement is employed, the cords 36, 39 may be connected by a string over the top wire 14 to ensure that both are kept clear of any entrance spouts such as 32. Furthermore, where the position of such spouts permit, corresponding portions of the arches 12, 16 may be connected by cord "side bars" 42 which tighten when wet and serve to prevent any inward sagging of the netting 29.

To collapse the trap for compact stowage it is merely necessary to release the peg-button 37 from the loop 38 whereupon the arches 12, 16 can be folded down substantially into the plane of the frame member 5, the link represented by the top wire 14 ensuring their simultaneous movement.

Haulage is conveniently effected by means of a rope bridle attached to the end loops 20 of the frame member 5, the V form assumed by the bridle having been found particularly effective for cutting through any seaweed in which the trap may become entangled, and should the resistance encountered be excessive rupture of the toggle fastening 36, 37 will permit collapse of the trap and further facilitate passage of the latter through the obstruction. The collapsability of the trap is equally advantageous in reducing the risk of damage thereto should rough weather cause it to be thrown against rocks.

During hauling the catch is tumbled towards the door, which can be quickly released for unloading and re-baiting of the trap.

It will be appreciated that the construction above described results in a trap which is extremely strong and durable as compared with traditional lobster or like traps, besides offering a minimum resistance to currents or surge so that it requires no addition of sinker weights to keep it in place on the sea-floor and is hence light enough for convenient handling by a fisherman without mechanical aids.

The rope binding of the frame members serves as a fender to prevent the protective coating of such members being damaged by abrasion against the sea-floor or the deck of a boat and also protects the netting where it lies in contact with such members.

In the preferred construction illustrated in FIGS. 7 and 8, the (or each) entrance spout 32 is formed in known manner as a tapering tube of cord netting which, however, may be braided with a substantially larger mesh than is customary, being thus easier and cheaper to produce.

The outer end of the spout 32 is united to the periphery of an opening left in the panel 29 of the trap's netting canopy, whilst the free loops of netting which define the lower and side portions of such spout's inner end have a stout supporting cord 43 threaded therethrough.

By anchoring the ends of this cord at suitable positions within the trap (for example, to an end arch 16 thereof and one of the intermediate arches 12) the inner end of the spout 32 is constrained to the form of an approximate semi-circle having its diametral edge uppermost. Preferably the supporting cord 43 is secured in such a manner that the spout 32 is directed to the trap's bait-carrier or -holder which may be represented by, or associated with, a cord loop 44 connecting the central parts of the wires 9, 14.

The concave bottom of the spout 32, at least adjacent the latter's inner end, has superimposed thereon (or is replaced by) a grating 45 formed of a flexible thermoplastic resin such as polyvinyl chloride or polyethylene.

It has been found convenient to construct such grating as a length of skeleton tube consisting of extruded thermoplastic strands which are permanently united in two mutually intersecting sets to provide a diamond mesh whose sides may measure anything between (say) ½ and 1 inch long.

The skeleton tube aforesaid is used in flat and diametrally-contracted form so that the superimposed sides thereof have an effective mesh-size amply close enough to prevent passage of a crustacean's claws and legs therethrough, whilst the folded edges of the resultant grating facilitate securement of the latter to the netting of the spout 32, the relative stiffness of the thermoplastic material serving to maintain the floor portion of such spout substantially fully extended in a lateral direction.

The wide outer end of the spout 32 tends to encourage the entrance of crustaceans whose progress towards the bait is further assisted by the close mesh of the thermoplastic grating 45 upon which their claws obtain excellent purchase, and the fact that such grating and the pull of the supporting cord 43 combine to give the spout a laterally-elongated cross-section which is particularly suited to the front elevational profile of a lobster or the like.

Preferably the grating 45 is so arranged that, at the inner extremity thereof, its constituent bars form bristles 46 which project freely beyond and/or across the adjacent end of the spout.

It has been found convenient for these projecting bristles 46 to have a somewhat greater degree of stiffness than the rest of the grating 45, an effect which may be achieved by leaching out the natural resilience of the thermoplastic material by graduated treatment with a suitable chemical (e.g. trichlorethylene in the case of a polyvinyl chloride grating).

After treatment as aforesaid and stretching to the desired width, the grating 45 is allowed to set in flat condition (except insofar as its relatively stiff inner end may, if desired, be given an upward inclination by engagement with a sutable former) the grating being thereafter readily incorporated in the spout 32.

It will be appreciated that whilst the projecting end bristles 46 of the grating 45 are resiliently deformable to permit easy entry of a fish into the trap, any subsequent attempted egress of such fish from a position below or at either side of the spout 32 will be foiled by the bristles 46 keeping it at bay and bending backwards under pressure so as to obstruct the end of the spout.

Furthermore, since the top 47 of the latter is unsupported by the cord edging 43 and hence relatively limp, any fish attempting to escape from a higher level will merely press down the spout top against the projecting bristles 46.

Thanks to the absence of any rigid eye or ring at its inner end, the improved spout aforesaid in no way hampers the collapsing of the trap, whose foldability may be further assisted by braiding the netting panel 29 with a square mesh as shown.

It will be appreciated that the escape-proof nature of the improved spout aforesaid, combined with the relative indestructability which results from the trap construction previously described, enables such a trap to be left for much longer periods between hauls than is expedient with known traps, with a consequent saving in labour and fuel (if used), less wear and tear on the fishermen's boat and gear, less limitation upon the total number of traps which a given boat can operate, and an overall improvement in fishing.

I claim:

1. A fish-trap comprising an openwork base defined by a metal frame of closed rectangular profile, a plurality of metal arches having their extremities pivoted to said base upon axes transverse to the latter, said arches having kinks in their crests, said kinks being in alinement, at least one link connecting the crests of said arches so as to constrain the same to simultaneous angular movement in the same direction, said link being rigid and having loops engaging said kinks to maintain them in parallel relation, a netting canopy extending over said arches and marginally connected to said base, releasable means for securing said arches and canopy in erected condition, and, further characterised in that the interior of the base frame is filled in with interlinked wire members anchored to such frame and coated with a protective composition, the ends of adjacent wires being hooked together on said frame, and rope bound about said wire ends and said frame.

2. A fish-trap comprising an openwork base defined by a metal frame of closed rectangular profile, a plurality of metal arches having their extremities pivoted to said base upon axes transverse to the latter, said arches having kinks in their crests, said kinks being in alinement, at least one link connecting the crests of said arches so as to constrain the same to simultaneous angular movement in the same direction, said link being rigid and having loops engaging said kinks to maintain them in parallel relation, a netting canopy extending over said arches and marginally connected to said base, releasable means for securing said arches and canopy in erected condition, and, further characterised in that the base frame and end arches are protected by a rope binding, said rope being secured at its ends to diagonally opposite corners of said frame and passing over said arches and also secures the netting canopy thereto.

3. A trap according to claim 2, further characterised in that one of the end arches has a fixed cross-bar upon which is hinged a U shaped metal member over which the adjacent end of the netting canopy is fastened to provide a door through which the trap can be emptied.

4. A trap according to claim 3, further characterised in that the releasable means for securing the arches and canopy in erected condition comprises two cords attached respectively to one corner of the base and to the crest of the opposite end arch, one such cord being attached to a peg-button adapted to be engaged with a loop in the other cord to form a diagonal brace.

5. A trap according to claim 4, further characterised in that the arches are constrained to collapsing movement in a single direction by means of a bracing cord permanently connected diagonally of the trap in opposition to the releasable securing means aforesaid.

6. A fish-trap comprising an openwork base defined by a metal frame of closed rectangular profile, a plurality of metal arches having their extremities pivoted to said base upon axes transverse to the latter, said arches having kinks in their crests, said kinks being in alinement, at least one link connecting the crests of said arches so as to constrain the same to simultaneous angular movement in the same direction, said link being rigid and having loops engaging said kinks to maintain them in parallel relation, a netting canopy extending over said arches and marginally connected to said base, releasable means for securing said arches and canopy in erected condition, and wherein the netting canopy is formed with an entrance spout having a floor portion, further characterised in that such spout comprises a tube of cord netting whoes inner end, at least, is constrained to a laterally-elongated cross-section by means of a flexible supporting member applied to the lower and side parts of its periphery only, the top portion of such spout being left limp and the floor portion thereof incorporating a relatively close-mesh grating of thermoplastic synthetic resin whose inner end projects beyond that of the spout and whose relative stiffness is such as to maintain the adjacent portion of the spout substantially at its maximum width whilst being insufficient to prevent flexure of the projecting end aforesaid under pressure from a fish entering, or attempting to leave the trap.

7. A trap according to claim 6, further characterised in that the inner terminal portion of the grating aforesaid form freely-projecting bristles.

8. A trap according to claim 7, further characterised in that the thermoplastic material is so treated that the bristles aforesaid have greater degree of stiffness from that of the rest of the grating.

References Cited in the file of this patent

UNITED STATES PATENTS

| | | |
|---|---|---|
| 540,952 | Crawford | June 11, 1895 |
| 905,263 | Wing | Dec. 1, 1908 |
| 1,187,359 | Martin | June 13, 1916 |
| 1,933,844 | Davis | Nov. 7, 1933 |
| 2,485,781 | Schreiber et al. | Oct. 25, 1949 |
| 2,910,801 | Safarik et al. | Nov. 3, 1959 |

FOREIGN PATENTS

| | | |
|---|---|---|
| 553,021 | France | 1923 |
| 99,286 | Sweden | 1940 |